(12) United States Patent
Schmidt et al.

(10) Patent No.: US 9,541,163 B2
(45) Date of Patent: Jan. 10, 2017

(54) TRANSMISSION, IN PARTICULAR FOR AN ADJUSTMENT DRIVE

(71) Applicant: Robert Bosch GmbH, Stuttgart (DE)

(72) Inventors: Willi Schmidt, Stutensee-Buechig (DE); Anja Burger, Buehl (DE); Gerhard Genter, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 14/365,916

(22) PCT Filed: Oct. 5, 2012

(86) PCT No.: PCT/EP2012/069778
§ 371 (c)(1),
(2) Date: Jun. 16, 2014

(87) PCT Pub. No.: WO2013/087248
PCT Pub. Date: Jun. 20, 2013

(65) Prior Publication Data
US 2015/0000444 A1    Jan. 1, 2015

(30) Foreign Application Priority Data
Dec. 14, 2011    (DE) .................. 10 2011 088 475

(51) Int. Cl.
*F16H 1/16*    (2006.01)
*F16H 1/20*    (2006.01)
(Continued)

(52) U.S. Cl.
CPC .............. *F16H 1/16* (2013.01); *B60N 2/166* (2013.01); *B60N 2/24* (2013.01); *F16H 57/0006* (2013.01); *Y10T 74/19828* (2015.01)

(58) Field of Classification Search
CPC ......... H02K 7/102; E05F 11/50; E05F 11/505; B60N 2/168; B60N 2/166; F16H 1/16; F16H 25/2454; F16H 48/285; F16H 55/24; F16H 55/22; F16H 55/32; F16H 57/0006; F16H 35/10; F16H 35/12; F16H 2035/005; F16H 57/028; F16H 55/14
See application file for complete search history.

(56) References Cited

U.S. PATENT DOCUMENTS 2,847,869 A * 8/1958 Hogan ................... F16H 25/20
                                              188/134
4,487,391 A * 12/1984 Rampel ................ B60N 2/0232
                                              188/83

(Continued)

FOREIGN PATENT DOCUMENTS

CN        2931949 Y       8/2007
DE        29702062        3/1997
(Continued)

OTHER PUBLICATIONS

International Search Report for Application No. PCT/EP2012/069778 dated Dec. 19, 2012 (English Translation, 2 pages).

*Primary Examiner* — William Kelleher
*Assistant Examiner* — Jake Cook
(74) *Attorney, Agent, or Firm* — Michael Best & Friedrich LLP

(57) ABSTRACT

The present invention relates to a transmission (1), in particular for an adjustment drive, comprising a housing (2), a worm shaft (3) which is rotatably mounted in the housing (2) and which can be driven, a worm wheel (4) which is rotatably mounted in the housing (2) and which meshes with the worm shaft (3), an encircling first wedge surface (5) which is formed on the worm wheel (4) or fixedly connected to the worm wheel (4), a brake element (6) which is arranged so as to be rotationally conjoint with respect to the worm (Continued)

wheel (4) and which has a second wedge surface (7), wherein the first wedge surface (5) bears areally against the second wedge surface (7).

14 Claims, 2 Drawing Sheets

(51) Int. Cl.
    *B60N 2/16*         (2006.01)
    *F16H 57/00*       (2012.01)
    *B60N 2/24*         (2006.01)

(56) References Cited

U.S. PATENT DOCUMENTS

| | | | |
|---|---|---|---|
| 4,747,319 A * | 5/1988 | Sakuta | B62D 33/07 |
| | | | 74/411.5 |
| 4,979,404 A | 12/1990 | Nakata et al. | |
| 5,655,405 A * | 8/1997 | Lerouge | B60S 1/166 |
| | | | 15/250.3 |
| 7,331,252 B2 * | 2/2008 | Pachov | B66D 1/14 |
| | | | 74/425 |
| 7,658,124 B2 * | 2/2010 | Brosowske | F01L 1/02 |
| | | | 74/409 |
| 2007/0161451 A1 | 7/2007 | Genter et al. | |
| 2009/0152057 A1 * | 6/2009 | Yamamoto | E05F 11/505 |
| | | | 188/72.7 |

FOREIGN PATENT DOCUMENTS

| | | |
|---|---|---|
| DE | 7638490 | 11/1997 |
| DE | 19619955 | 11/1997 |

\* cited by examiner

TRANSMISSION, IN PARTICULAR FOR AN ADJUSTMENT DRIVE

BACKGROUND OF THE INVENTION

The present invention relates to a gear mechanism, in particular for an adjustment drive, and to an adjustment drive, in particular for a motor vehicle seat, comprising at least one gear mechanism.

DE 10 2004 013 543 A1 presents an adjustment drive having a gear mechanism. The gear mechanism comprises a worm gear mechanism stage and an eccentric mechanism stage. In particular in the case of such self-braking movement gear mechanisms, so-called "chatter vibrations" can occur in particular during a lowering operation as part of a seat height adjustment. In particular in the case of gear mechanisms for seat height adjustment in a motor vehicle, this leads to disturbing noises being generated during the lowering of the seat.

SUMMARY OF THE INVENTION

The gear mechanism according to the invention makes it possible for chatter vibrations to be eliminated. In particular when the gear mechanism is used in an adjustment drive for a motor vehicle seat, the gear mechanism according to the invention prevents chatter vibrations and thus the generation of noise during the lowering of the seat. These advantages are achieved by means of a gear mechanism, in particular for an adjustment drive, comprising a housing and a worm shaft which is rotatably mounted in the housing. The worm shaft is in particular arranged so as to be driven by an electric motor. Furthermore, a worm gear that meshes with the worm shaft is rotatably mounted in the housing. The rotation and the torque of the worm shaft are thus transmitted to said worm gear. A first wedge surface is formed on the worm gear or on an element that is fixedly connected to the worm gear. Said first wedge surface thus rotates together with the worm gear and is fixedly connected to the worm gear. Furthermore, the gear mechanism comprises a brake element with a second wedge surface. Said brake element is arranged so as to be rotationally fixed with respect to the worm gear. In particular, the brake element is mounted rotationally fixedly in the housing. According to the invention, the first wedge surface lies areally against the second wedge surface. By means of the brake element according to the invention, a high braking torque is transmitted to the worm gear both in the axial direction and also in the radial direction by the two wedge surfaces. In this way, even when there is high load on the worm gear, that is to say for example during the lowering of heavy vehicle seats, and also in the presence of high temperatures, the undesired chatter vibration is eliminated.

In a preferred embodiment, a spring is provided which is arranged so as to press the two wedge surfaces toward one another. It is provided here in particular that the spring is supported with one end against the housing and with the other end against the brake element. The spring thus exerts load on the brake element in the axial direction, that is to say in the direction of the axis of rotation of the worm gear. It is preferable here for one spring or multiple springs to be arranged so as to be distributed over the circumference. The spring may be a spiral spring, a plate spring or an elastomer spring (O-ring).

It is preferable for the two wedge surfaces to be inclined by the same angle with respect to the axis of rotation of the worm gear. By virtue of the two wedge surfaces being formed with the same angle of inclination, it is ensured that the two wedge surfaces always lie areally against one another. The inclination with respect to the axis of rotation of the worm gear gives rise to a braking moment in the radial direction of the worm gear when the first wedge surface rubs against the second wedge surface, wherein, at the same time, a force can be transmitted in the direction of the axis of rotation of the worm gear. In a particularly preferred embodiment, it is provided that an angle between the first and second wedge surfaces and the axis of rotation of the worm gear is less than 90° and greater than 0°. In particular, said angle lies between 85° and 5°, in particular between 70° and 20°, in particular between 60° and 30°.

It is also preferably provided that the first wedge surface is formed over the full circumference on an inner surface of the worm gear or on an inner surface of an element that is fixedly connected to the worm gear. By means of this arrangement, the first wedge surface can be arranged in the gear mechanism in a space-saving manner. An "inner surface" is to be understood to mean a surface which faces toward the axis of rotation of the worm gear.

It is furthermore preferably provided that the brake element is in the form of a closed ring, wherein the second wedge surface is formed over the full circumference on the ring. Likewise, the first wedge surface is also preferably formed over the full circumference. The two wedge surfaces are in particular arranged coaxially with the axis of rotation of the worm gear.

Furthermore, provision is preferably made of at least one projection, which engages into the housing, on the brake element and/or of a recess, into which the housing engages, in the brake element. By means of this configuration, it is ensured that the brake element does not rotate relative to the housing.

Furthermore, the gear mechanism preferably comprises a self-locking gear mechanism stage. Said self-locking gear mechanism stage is in particular arranged at the drive output side of the worm gear. The worm gear thus transmits a rotation and a torque to said self-locking gear mechanism stage. It is preferable for said gear mechanism stage to be formed as an eccentric mechanism stage, a planetary gear mechanism stage or as a screw mechanism stage.

The invention furthermore encompasses an adjustment drive, in particular for a motor vehicle seat, comprising at least one of the gear mechanisms described above and an electric motor, in particular a permanently excited direct-current motor, for driving the worm shaft. It is particularly preferable for the spring described above to be arranged so as to press the brake element with the second wedge surface in the direction of the drive output, in particular in the direction of the self-locking gear mechanism stage. The adjustment drive according to the invention is utilized in particular for seat height adjustment of a motor vehicle seat.

The advantageous refinements described with regard to the gear mechanism according to the invention can be correspondingly advantageously applied to the adjustment drive according to the invention.

BRIEF DESCRIPTION OF THE DRAWINGS

An exemplary embodiment of the invention will be described in detail below with reference to the appended drawing, in which.

DETAILED DESCRIPTION

Figure 1:
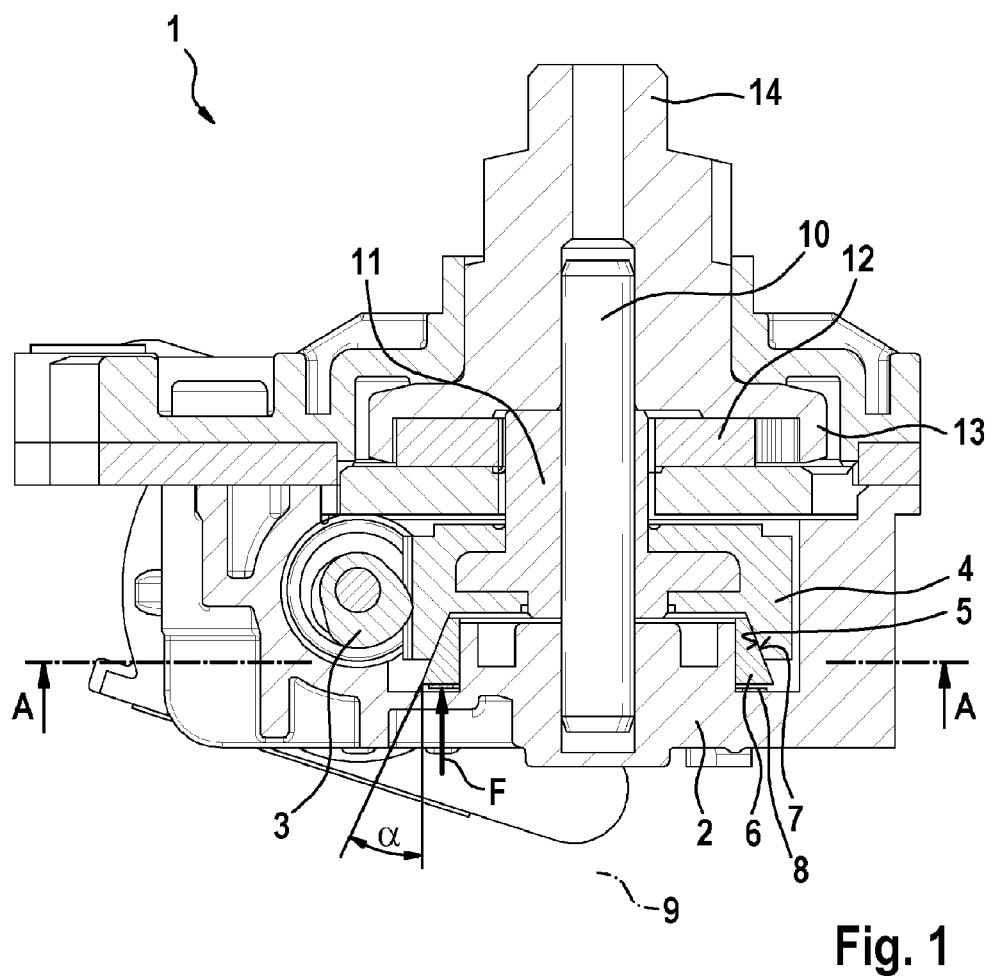
FIG. 1 shows a first sectional view of the gear mechanism according to the invention, as per a first exemplary embodiment.

FIG. 1 shows a gear mechanism 1 for an adjustment drive, in particular for a motor vehicle seat. The gear mechanism 1 comprises a housing 2, a worm shaft 3 which is rotatably mounted in the housing 2, and a worm gear 4 which is rotatably mounted in the housing 2. The worm gear 4 meshes with the worm shaft 3. A first wedge surface 5 is formed on an inner surface of the worm gear 4 over the full circumference of the worm gear 4. The first wedge surface 5 is arranged coaxially with respect to an axis of rotation 9 of the worm gear 4.

Also situated in the housing 2 is a brake element 6. Said brake element 6 is accommodated in a rotationally fixed manner in the housing 2. The brake element 6 is in the form of a closed ring. A second wedge surface 7 is formed on the brake element 6. The second wedge surface 7 is arranged over the full circumference around the entire brake element 6. The second wedge surface 7 is aligned coaxially with respect to the axis of rotation 9 of the worm gear 4. Furthermore, the brake element 6 is linearly movable in the direction of the axis of rotation 9. Between the brake element 6 and the housing 2 there is arranged at least one spring 8. Said spring 8 is also referred to as axial spring. The spring 8 pushes the brake element 6 against the first wedge surface 5 in the direction of the axis of rotation 9. In this way, the first wedge surface 5 lies against the second wedge surface 7.

By means of said brake element 6 and the two wedge surfaces 5, 7, both a force acting in the axial direction and also a braking moment acting in the direction of rotation around the axis of rotation 9 are transmitted to the worm gear 4. In this way, chatter vibrations in the worm gear 4 are dampened.

FIG. 1 shows, by way of the reference sign F, the force exerted on the brake element 6 by the spring 8. Also shown in FIG. 1 is an angle $\alpha$. The first wedge surface 5 and the second wedge surface 7 are inclined with respect to the axis of rotation 9 by said angle $\alpha$.

Furthermore, FIG. 1 shows a journal 10. The journal 10 is installed fixedly in the housing 2. An eccentric element 11 and a drive output element 14 are rotatably mounted on said journal 10. The eccentric element 11 is connected rotationally conjointly to the worm gear 4. An eccentric gear 12 is mounted rotatably on the eccentric element 11. Said eccentric gear 12 is in the form of a spur-toothed gearwheel. The drive output element 14 comprises a toothed internal gear 13. The internal gear 13 meshes with the eccentric gear 12.

Via the eccentric element 11, the eccentric gear 12, the internal gear 13 and the drive output element 14, the rotational movement and the torque are transmitted to the motor vehicle seat to be adjusted.

As an alternative to the first wedge surface 5 being implemented on the worm gear 4, it is for example also possible for the first wedge surface 5 to be formed on the eccentric element 11.

Figure 2:
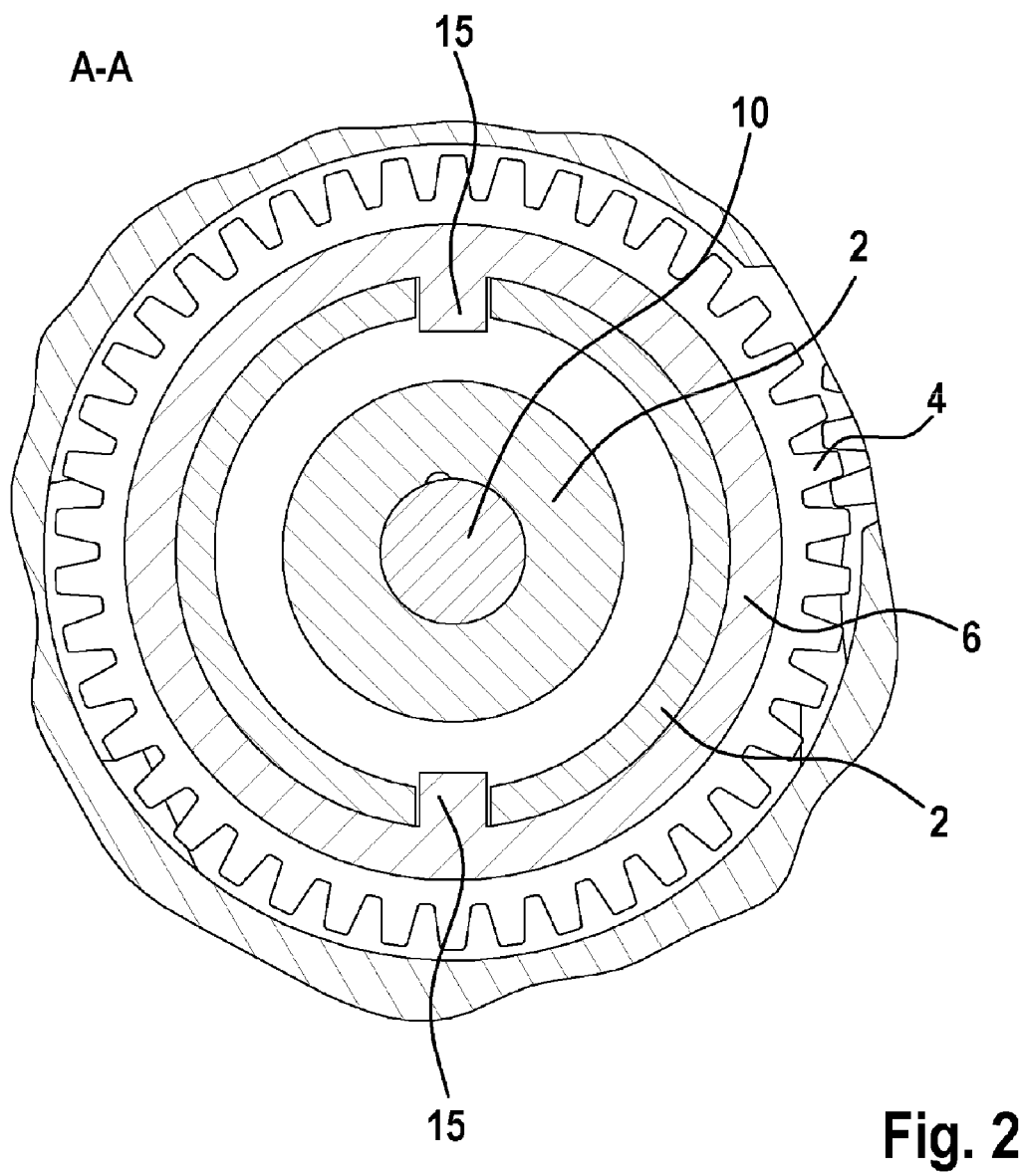
FIG. 2 shows a second sectional view of the gear mechanism according to the invention, as per the exemplary embodiment.

FIG. 2 shows a further section through the gear mechanism 1 as per the exemplary embodiment. The section is along the line A-A (see FIG. 1). As can be seen in FIG. 2, the brake element 6 comprises two inwardly projecting projections 15. Said two projections 15 engage into corresponding grooves in the housing 2. By means of said projections 15, the brake element 6 is accommodated in a rotationally fixed and linearly movable manner in the housing 2.

Based on the spring force F of the spring 8, the boost factor for the frictional torque at the wedge surfaces 5, 7 is defined by way of the angle $\alpha$. It is thus possible even with relatively low spring forces to achieve high frictional torques for eliminating chatter vibrations.

What is claimed is:

1. A gear mechanism (1) comprising
   a housing (2),
   a driveable worm shaft (3) which is rotatably mounted in the housing (2),
   a worm gear (4) which is rotatably mounted in the housing (2) and which meshes with the worm shaft (3),
   an encircling first wedge surface (5) which is formed on the worm gear (4) or fixedly connected to the worm gear (4), and
   a brake element (6) which is rotationally fixed with respect to the housing (2) and which has a second wedge surface (7),
   wherein the first wedge surface (5) lies circumferentially against the second wedge surface (7).

2. The gear mechanism as claimed in claim 1, characterized by at least one spring (8) which is arranged so as to press the first and second wedge surfaces (5, 7) toward one another.

3. The gear mechanism as claimed in claim 2, characterized in that the at least one spring (8) is supported with one end against the housing (2) and with another end against the brake element (6) in order to press the second wedge surface (7) against the first wedge surface (5).

4. The gear mechanism as claimed in claim 1, characterized in that the first and second wedge surfaces (5, 7) are inclined by the same angle ($\alpha$) with respect to an axis of rotation (9) of the worm gear (4).

5. The gear mechanism as claimed in claim 1, characterized in that an angle ($\alpha$) between the first and second wedge surfaces (5, 7) and an axis of rotation (9) of the worm gear (4) is less than 90° and greater than 0°.

6. The gear mechanism as claimed in claim 1, characterized in that the first wedge surface (5) is formed over a full circumference on an inner surface of the worm gear (4) or on an inner surface of an element that is fixedly connected to the worm gear (4).

7. The gear mechanism as claimed in claim 1, characterized in that the brake element (6) is in the form of a closed ring, wherein the second wedge surface (7) is formed over a full circumference on the ring.

8. The gear mechanism as claimed in claim 1, characterized by a projection (15), which engages into the housing (2), on the brake element (6) for the purpose of preventing rotation of the brake element (6).

9. The gear mechanism as claimed in claim 1, characterized by a self-locking gear mechanism stage (11, 12, 13), planetary gear mechanism stage or screw mechanism stage, at the drive output side of the worm gear (4).

10. An adjustment drive for a motor vehicle seat, comprising at least one gear mechanism (1) according to claim 1 and an electric motor for driving the worm shaft (3).

11. The gear mechanism as claimed in claim 1, characterized in that an angle ($\alpha$) between the first and second wedge surfaces (5, 7) and an axis of rotation (9) of the worm gear (4) is between 85° and 5°.

12. The gear mechanism as claimed in claim 1, characterized in that an angle ($\alpha$) between the first and second wedge surfaces (5, 7) and an axis of rotation (9) of the worm gear (4) is between 70° and 20°.

13. The gear mechanism as claimed in claim 1, characterized in that an angle (α) between the first and second wedge surfaces (5, 7) and an axis of rotation (9) of the worm gear (4) is between 60° and 30°.

14. The gear mechanism as claimed in claim 1, characterized by an eccentric mechanism stage, planetary gear mechanism stage or screw mechanism stage, at the drive output side of the worm gear (4).

* * * * *